United States Patent
Zhu et al.

(10) Patent No.: US 6,853,770 B2
(45) Date of Patent: Feb. 8, 2005

(54) METHOD FOR ALIGNING AND ASSEMBLING OPTICAL DEMULTIPLEXER MODULE, AND AUTOMATIC ALIGNING MECHANISM FOR OPTICAL DEMULTIPLEXER MODULE

(75) Inventors: Frank Xiaofan Zhu, Cupertino, CA (US); Shigeki Nagasaka, Osaka (JP); Naoki Morimoto, Osaka (JP); Kenichi Nakama, Osaka (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 18 days.

(21) Appl. No.: 10/250,339

(22) PCT Filed: Dec. 25, 2001

(86) PCT No.: PCT/JP01/11377

§ 371 (c)(1),
(2), (4) Date: Jun. 27, 2003

(87) PCT Pub. No.: WO02/054130

PCT Pub. Date: Jul. 11, 2002

(65) Prior Publication Data

US 2004/0033026 A1 Feb. 19, 2004

(30) Foreign Application Priority Data

Dec. 27, 2000 (JP) ........................................ 2000-398713

(51) Int. Cl.$^7$ .............................. G02B 6/34; H01J 14/02
(52) U.S. Cl. ............................. 385/37; 385/31; 385/33; 385/39; 385/52; 385/127; 385/130; 385/135; 385/136
(58) Field of Search .............................. 385/24, 31, 33, 385/37, 39, 52, 135, 136; 356/127, 130

(56) References Cited

U.S. PATENT DOCUMENTS 6,360,041 B1 * 3/2002 Nakama et al. ................ 385/37
6,498,892 B1 * 12/2002 Harman ....................... 385/137
6,616,346 B1 * 9/2003 Brown et al. .................. 385/90

FOREIGN PATENT DOCUMENTS

| EP | 1 041 411 | * 3/2000 | ........... G02B/6/293 |
| JP | 64-25109 | 1/1989 | .................. 385/52 |
| JP | 9-80250 | 3/1997 | .................. 385/52 |
| JP | 9-127364 | 5/1997 | .................. 385/52 |
| JP | 9-159883 | 6/1997 | .................. 385/52 |
| JP | 3112154 | 9/2000 | .................. 385/52 |
| JP | 2000-284141 | 10/2000 | .................. 385/37 |

* cited by examiner

Primary Examiner—Brian Healy
Assistant Examiner—Christopher M. Kalivoda
(74) Attorney, Agent, or Firm—Merchant & Gould P.C.

(57) ABSTRACT

The present invention relates to a method of aligning and assembling an optical demultiplexer module having an input fiber, a collimator lens, a diffraction grating, and a photodetector array, and a mechanism for automatically aligning such an optical demultiplexer module. The method comprises the steps of preparing a submodule A including the input fiber and the photodetector array and a submodule B including the diffraction grating and the collimator lens, preparing an alignment jig for allowing the submodules A, B to move independently of each other, fixing the submodules A, B to the adjustment jig, and applying light from the input fiber and moving the submodule B with respect to the submodule A for maximizing a light output from a photodetector.

12 Claims, 2 Drawing Sheets

METHOD FOR ALIGNING AND ASSEMBLING OPTICAL DEMULTIPLEXER MODULE, AND AUTOMATIC ALIGNING MECHANISM FOR OPTICAL DEMULTIPLEXER MODULE

TECHNICAL FIELD

The present invention relates to a method of aligning and assembling an optical demultiplexer module for use in the field of optical communications and a mechanism for automatically aligning such an optical demultiplexer module.

BACKGROUND ART

Optical demultiplexer modules have a function to demultiplex waveform-multiplexed light, and are capable of receiving a multiplexed light signal and producing output signals separated in respective channels. Generally, input light is introduced from a single optical fiber into an optical demultiplexer module, which properly separates the input light into signals of respective channel wavelengths therein, and applies the signals to a plurality of respective optical fibers or photodetector devices for respective separate channels, thereby producing output signals in the respective separate channels.

The wavelength band mainly used in the field of optical communications at present is a 1550 nm band with channels separated at frequency intervals of 100 GHz. If the frequency intervals are expressed in terms of wavelength pitches, then the signals in the channels are arranged at wavelength intervals of about 0.8 nm. An optical demultiplexer module is required to angularly separate the signals with a diffraction grating and apply them accurately to different optical fibers or photodetector devices in respective channels. Since the wavelength intervals are small, the light beams emitted in the respective channels from the diffraction grating have small angular differences.

For assembling an optical demultiplexer module, an active alignment process is carried out by fixing the components thereof in respective given positions such that light having waveforms corresponding to respective channels is introduced from an input fiber and outputted accurately from output fibers or photodetector devices. The alignment process needs time, and a very large expenditure of time and labor is required to perform the alignment process. Highly accurate and expensive apparatus are needed to assemble optical demultiplexer modules.

Also, an optical demultiplexer module is made up of many components and is assembled according to a complex assembling procedure. Since it is particularly necessary to take care of variations in characteristics and dimensions of the components and slight environmental changes, an assembling algorithm is not easy to determine, it is difficult to automatize the assembling process, as a result of which skilled workers need to work on the components, resulting in difficulties with the mass production of optical demultiplexer modules.

If a passive alignment process is employed in lieu of the active alignment process, then errors with respect to dimensions of various components and devices and assembling errors, represented by the following accuracies, are accumulated:

(1) the cutting accuracy of the diffraction grating with respect to the direction of grooves;

(2) the mounting accuracy of a photodetector array chip;

(3) the accuracy of the package of a photodetector array;

(4) the dimensional accuracy of a casing; and (5) the assembling and bonding accuracy of the above components.

It is thus difficult to achieve a desired performance level with the passive alignment process which depends on abutment of the components, for aligning and assembling optical demultiplexer modules which require a high level of accuracy.

DISCLOSURE OF THE INVENTION

The present invention has been made in view of the above problems. The present invention provides a method of aligning and assembling an optical demultiplexer module to manufacture same highly accurately with ease and a mechanism for automatically aligning such an optical demultiplexer module. In particular, the present invention provides a method of aligning and assembling an optical demultiplexer module to manufacture same with sufficient accuracy in a short period of time without using complex equipment and also without the need for skilled practice, and a mechanism for automatically aligning such an optical demultiplexer module.

According to the present invention, a method of aligning and assembling an optical demultiplexer module having at least an input fiber, a collimator lens, a diffraction grating, and a photodetector array, comprises the steps of:

(a) preparing a submodule A including the input fiber and the photodetector array which are fixed in respective positions, and a submodule B including the diffraction grating and the collimator lens which are fixed in respective positions;

(b) preparing an alignment jig for allowing the submodules A, B to move independently of each other, and, when the submodules are held by the alignment jig, adjusting the submodules such that a reference surface of the submodule A and an alignment moving direction in which the submodule B is relatively movable for alignment have a predetermined relationship to each other;

(c) fixing the submodule A to the adjustment jig such that a reference line of the photodetector array lies horizontally;

(d) fixing the submodule B to the adjustment jig such that grooves of the diffraction grating extend vertically; and (e) applying light having a wavelength corresponding to one or more channels from the input fiber, moving the submodule B with respect to the submodule A to align the submodules for maximizing a light output from a photodetector corresponding to the channel or channels.

The submodule B further includes first and second tubes slidable against each other, the collimator lens and the diffraction grating being fixed to the second tube, and the method further comprises the step of (f) bringing the first tube as an adjustment tube into sliding contact with the second tube while the second tube is being fixed, and bonding the submodules A, B to each other, so as to hold a positioning relationship between the submodules A, B after the step (e).

The alignment moving direction is a direction Z along which the submodules A, B are movable toward and away from each other, and the predetermined relationship is a relationship in which the reference surface of the submodule A and the alignment moving direction of the submodule B are perpendicularly to each other. Alternatively, the alignment moving direction is a direction X along which the submodules A, B are movable horizontally parallel to each other, and the predetermined relationship is a relationship in which the reference surface of the submodule A and the alignment moving direction of the submodule B are parallel to each other. Alternatively, the alignment moving direction is a direction Y along which the submodules A, B are movable vertically parallel to each other, and the predetermined relationship is a relationship in which the reference surface of the submodule A and the alignment moving direction of the submodule B are parallel to each other. Further alternatively, the alignment moving direction is a direction z around an optical axis of the submodule B, and the predetermined relationship is a relationship in which the submodule B is angularly displaceable with respect to the reference surface of the submodule A.

More preferably, the alignment moving direction includes a direction Z along which the submodules A, B are movable toward and away from each other, a direction X along which the submodules A, B are movable horizontally parallel to each other, a direction Y along which the submodules A, B are movable vertically parallel to each other, and a direction z around an optical axis of the submodule B, the step (e) comprising the step of successively moving the submodules A, B successively in the directions Z, X, Y, z to maximize light outputs in the respective directions.

According to the present invention, there is also provided a mechanism for automatizing an aligning process when an optical demultiplexer module is assembled. The optical demultiplexer module has a submodule A including an input fiber and a photodetector array which are fixed in respective positions, and a submodule B including a diffraction grating and a collimator lens which are fixed respective positions. The mechanism comprises:

a fixed table;

a first movable unit mounted on the fixed table and movable in a first moving direction with respect to the fixed table by a first motor which is installed on the first movable unit;

a second movable unit mounted on the first movable unit and movable in a second moving direction with respect to the first movable unit by a second motor which is installed on the second movable unit;

a first support vertically fixed to the second movable unit;

a third movable unit mounted on the first support and movable in a third direction with respect to the first support by a third motor which is installed on the third movable unit, the third movable unit having gripping means for gripping the submodule B;

a rotary actuator unit mounted on the third movable unit for gripping and rotating the submodule B on the third movable unit with a fourth motor which is installed on the rotary actuator unit;

a second support vertically fixed to the fixed table for supporting the submodule A fixedly thereon;

a light source for introducing light of an arbitrary wavelength into the optical fiber; and a computer system for controlling the first through fourth motors to move the submodule B with respect to the submodule A to maximize an optical output from the photodetector array which detects a light beam applied from the submodule A through the input fiber and reflected and focused by the collimator lens and the diffraction grating of the submodule B.

BEST MODE FOR CARRYING OUT THE INVENTION

Figure 1:
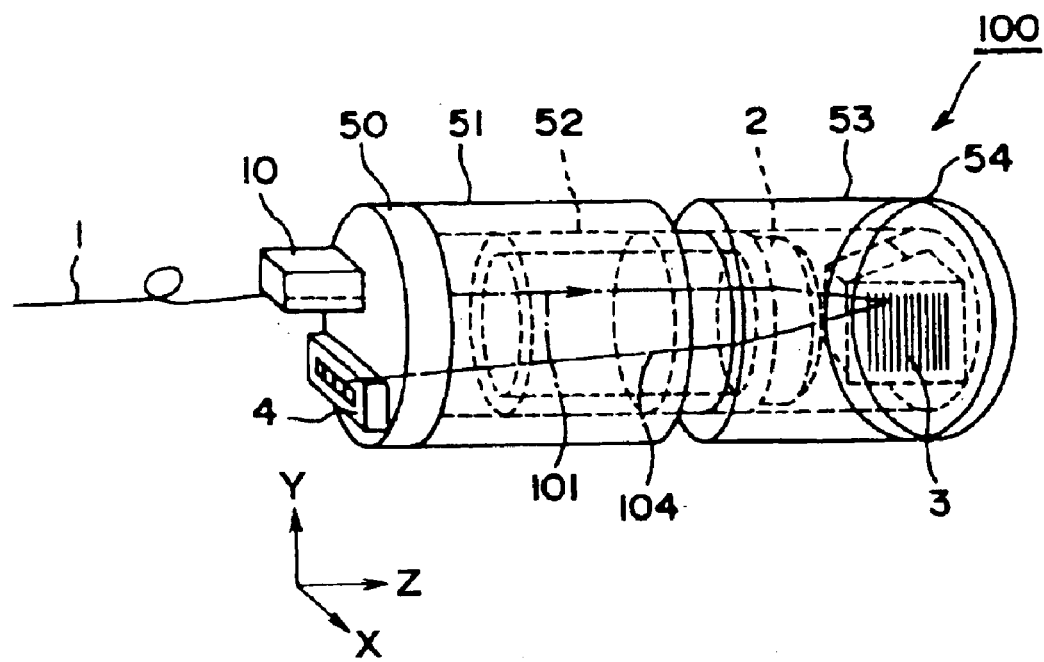
FIG. 1 is a perspective view showing a completed optical demodulator module according to the present invention.
Figure 2:
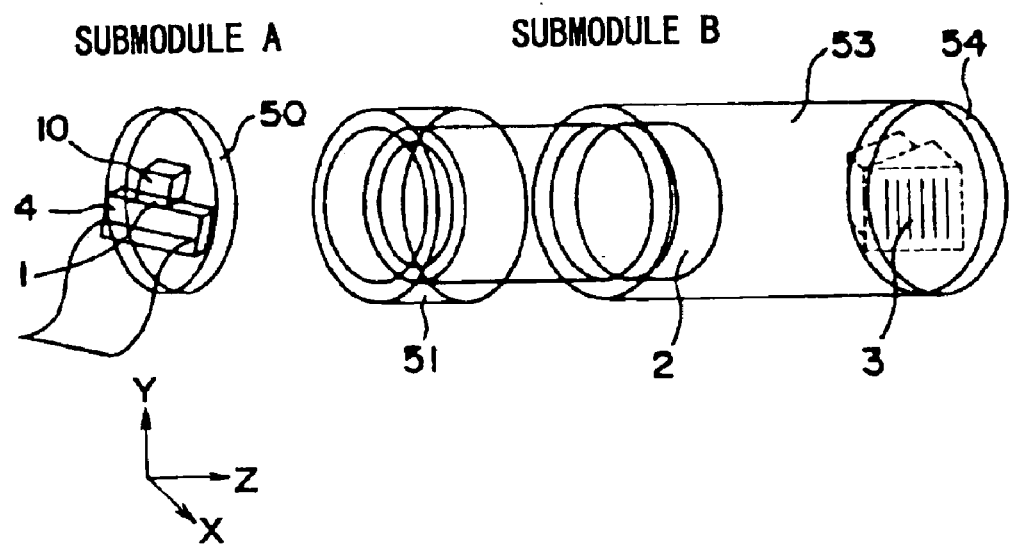
FIG. 2 is a partial exploded perspective view of an optical demodulator module shown as divided into two submodules in a method of aligning and assembling an optical demultiplexer module according to a first embodiment of the present invention.

A basic arrangement of an optical demultiplexer module according to the present invention will first be described below with reference to a perspective view of FIG. 1.

An optical demultiplexer module 100 according to the present invention comprises a single input optical fiber 1, a collimator lens 2, and a diffraction grating 3 as components, and has a plurality of transparent or semitransparent tubes 51, 52, 53 (though three tubes are shown in the illustrated example, any desired number of tubes may be used) which are independent of each other with the above components bonded or fixed thereto, the tubes having such inside and outside diameters that they are interfitted and slidable axially.

An external input is introduced from the optical fiber 1 into the tubes, and a divergent light beam 101 spreading depending on the numerical aperture of the fiber reaches the collimator lens 2, which converts the divergent light beam 101 into a parallel light beam that reaches the diffraction grating 3. The light beam is separated into light beams of respective wavelengths by the diffraction grating 3 depending on the chromatic dispersion characteristics of the diffraction grating 3. The light beams are then converted into respective convergent light beams 104 of respective demultiplexed wavelengths by the collimator lens 2. The convergent light beams 104 are focused on one surface of a side plate 50 (transparent glass disk member) which is positioned at the focal point of the collimator lens 2, and are arranged as an array of beam spots on the one surface of the side plate 50. The input fiber 1 has an open end positioned by a fiber joint 10 on the one surface of the side plate 50 which lies on the focal plane of the collimator lens 2. The diffraction grating 3 is mounted on an inner surface of a side plate 54 (disk member) fixed to an end of the tube 53. The diffraction grating 3 is disposed at such an angle to reflect diffracted light beams produced from the light beam introduced from the input fiber 1 and applied from the collimator lens 2, back toward the collimator lens 2, which focuses the light beams onto the focal plane of the collimator lens 2. The focused beam spots produced on the focal plane by the demultiplexed light beams of the respective wavelengths are monitored or detected by a photodetector array or fiber array 4 which is bonded or fixed in a position that is conjugate to the input fiber 1 on the focal plane on the one surface of the side plate 50, and which is mounted in an independent sealed package.

The optical demultiplexer module 100 includes roughly three tubes, preferably hollow cylindrical tubes 51, 52, 53. The single-core input fiber 1 is fixed to an end face (left end face in FIG. 1) of the tube 51 which is transparent for mounting the fiber thereon, by the fiber-fixing side plate 50 and the fiber joint 10. Similarly, the collimator lens 2 is fixed to an end face (right end face in FIG. 1) of the tube 52. The diffraction grating 3 is fixed to an end face (right end face in FIG. 1) of the tube 53 by the diffraction grating fixing side plate 54. In this embodiment, the tubes 52, 53 are integrally joined to each other as by adhesive bonding after the collimator lens 2 is fixed to the end face of the tube 52. The end of the tube 52 is fitted in the tube 51 as an adjustment tube. The outside diameter of the tube 52 and the inside diameter of the tube 51 are dimensioned such that the tubes 51, 52 are slidable against each other without play therebetween so that they are movable along and rotatable around the optical axis.

A specific process of aligning and assembling the optical demultiplexer module described above will be described below.

<1st Step>

For aligning and assembling the optical demultiplexer module, two submodules A, B, described below, are prepared, and components are fixed in position within the submodules A, B.

Submodule A: This includes the optical fiber 1 and the photodetector array (PDA) 4 that are fixed in position on one surface of the side plate (transparent glass disk) 50.

Submodule B: This includes the diffraction grating 3 that is fixed in position on one surface of the diffraction grating fixing side plate 54, and the collimator lens 2. The collimator lens 2 is fixed to one end of the tube 52, and encased in the distal end of the tube 53. After the collimator lens 2 fixed to one end of the tube 52 is encased in the tube 53, the tubes 52, 53 are fixed to each other by an adhesive or the like. At this time, the tube 51 as an adjustment tube for connecting the submodules A, B is not fixed to the tube 52.

<2nd Step>

The submodules A, B are then aligned with each other by an active alignment process as follows:

1st substep: An alignment jig for allowing the submodules A, B to move independently of each other is prepared. The submodules A, B are held by the alignment jig. At this time, the submodules A, B are adjusted such that the direction indicated by the arrow Z along which the submodule B is moved for alignment is perpendicular to a surface (reference surface) of the side plate 50 of the submodule A which is opposite to the surface to which the optical fiber 1 and the PDA 4 are fixed.

2nd substep: Then, the submodule A is fixed to the alignment jig such that the PDA 4 has its reference line (along the array of photodetectors) extending horizontally.

3rd substep: The submodule B is fixed to the alignment jig such that the grooves of the diffraction grating 3 extend vertically.

4th substep: Thereafter, a light beam having a waveform corresponding to one channel is introduced from the optical fiber 1, and the submodule B is moved for alignment (active alignment) to maximize an output signal from the photodetector of the photodetector array 4 which corresponds to the channel.

5th substep: If necessary, the above 4th substep is carried out for a different wavelength (channel).

6th substep: After the alignment process is completed, the submodules A, B are bonded to each other in their established positional relationship, using the adjustment tube (tube 51).

The submodule B is constructed of the two tubes 52, 53 as cylindrical casings, the side plate 54, and the collimator lens 2 and the diffraction grating 3 which are fixed to the tubes 52, 53 and the side plate 54. The diffraction grating 3 is fixed to the inner surface of the side plate 54 at a position slightly offset from the central axis of the tube 53, the diffraction grating 3 being inclined at a predetermined angle to the surface of the side plate 54. The collimator lens 2 is fixed to the end of the tube 52. The tubes 52, 53 are fixed to each other with the collimator lens 2 and the diffraction grating 3 being spaced from each other by a predetermined distance. On the submodule A, the end of the optical fiber 1 (as supported by the fiber joint 10) and the PDA 4 are fixed in a positional relationship of certain accuracy with respect to each other within one surface (the one surface of the side plate 50). The submodule B can be aligned with the submodule A within a range represented by an angular interval $z_1$ around the optical axis Z, a distance $z_2$ along the optical axis Z, and distances x, y in directions perpendicular to the optical axis Z. The submodules A, B are finally fixed to each other by bonding the circular side plate 50 of the submodule A, which has a slightly larger diameter than the outside diameter of the adjustment tube 51, to the distal end of the adjustment tube 51 while keeping the circular side plate 50 in its adjusted position based on the distances x, y, and bonding the adjustment tube 51, which has an inside diameter allowing the adjustment tube 51 to slidingly fit over the distal end of the tube 52 of the submodule B, to the tube 52 while keeping the adjustment tube 51 in its adjusted position based on the angular interval $z_1$ and the distance $z_2$. The adjustment tube 51 needs to have a length larger than the distance between the inner flat surface of the circular side plate 50 of the submodule A and the distal end of the submodule B (the tube 52) in the finally aligned position based on the distance $z_2$.

Figure 3:
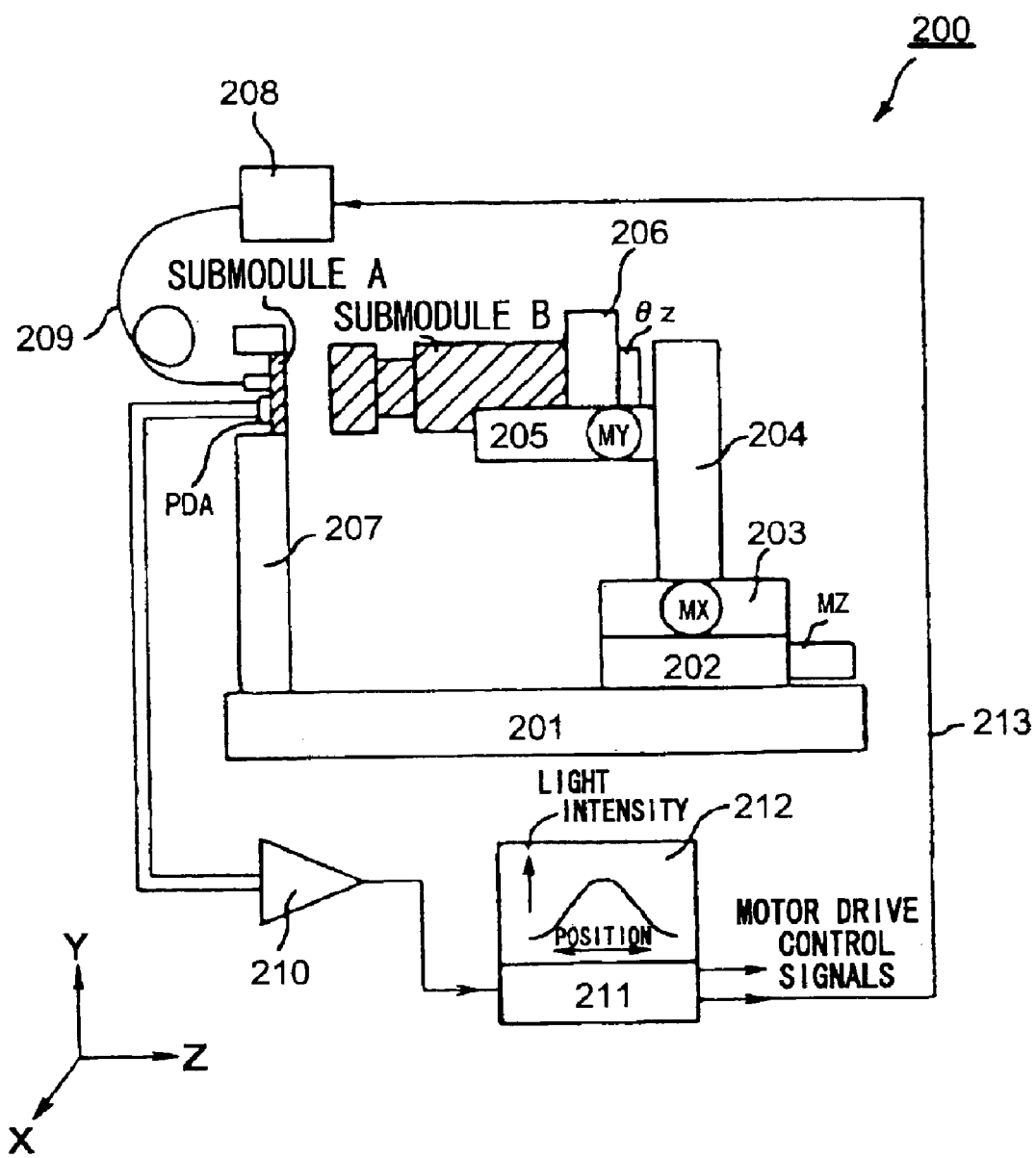
FIG. 3 is a schematic side elevational view of a mechanism for automatically aligning an optical demultiplexer module according to a second embodiment of the present invention.

An automatic aligning mechanism according to a second embodiment of the present invention will be described below. FIG. 3 shows in schematic side elevation an automatic aligning mechanism 200 according to a second embodiment of the present invention. As shown in FIG. 3, the automatic aligning mechanism 200 comprises a fixed table 201, a first movable unit 202 mounted on the fixed table 201 and movable in the direction indicated by the arrow Z (left and right directions on the sheet of FIG. 3) with respect to the fixed table 201 by a motor MZ which is installed on the first movable unit 202, a second movable unit 203 mounted on the first movable unit 202 and movable in the direction indicated by the arrow X (normal to the sheet of FIG. 3) with respect to the first movable unit 202 by a motor MX which is installed on the second movable unit 203, a first support 204 vertically fixed to the second movable unit 203, a third movable unit 205 mounted on the first support 204 and movable in the direction indicated by the arrow Y (vertical direction) with respect to the first support 204 by a motor MY which is installed on the third movable unit 205, a rotary actuator unit 206 mounted on the third movable unit 205 for gripping and rotating the submodule B through the angular interval $z_1$ about its own axis with a motor M $z_1$ which is installed on the rotary actuator unit 206, and a second support 207 vertically fixed to the fixed table 201 for supporting the submodule A fixedly thereon.

The automatic aligning mechanism 200 also has a computer 211. The computer 211 outputs an adjustment signal for adjusting the output power of a light source 208 through a signal line 213 to the light source 208 to enable the light source 208 to introduce input light through an optical fiber 209 into an optical demultiplexer module. The computer 211 receives output signals from the respective photodetectors of the PDA 4 of the submodule A through an amplifier 210, monitors the output signals from the respective photodetectors as indicated by 212, controls the motors with respective motor driver circuits (not shown) to maximize the output signals from the respective photodetectors (to maximize the light intensities), and controls the power of the input light introduced through the optical fiber 209. The motor driver circuits are omitted from illustration in FIG. 3.

Prior to an automatic alignment process, the submodule A (the circular side plate 50) is fixed to the second support 207. The submodule A is not moved during the automatic alignment process. However, the circular side plate 50 needs to be preadjusted so as to lie parallel to the end face of the submodule B. The circular side plate 50 may be preadjusted by a known adjustment mechanism, which is not shown. All moving mechanisms of the automatic aligning mechanism 200 are associated with the submodule B for moving the submodule B, in which the V grooves of the diffraction grating 3 are held vertically, in the directions X, Y, Z and z for alignment.

With the automatic aligning mechanism 200, the various movable units which are capable of making adjustments identical to those illustrated in the first embodiment are actuated by the motors to perform corresponding scanning processes. Initially, the light source 208 is set to a high intensity level, and introduces light of an arbitrary wavelength through the optical fiber 208 into the submodule B. A given channel in the PDA 4 of the submodule A is monitored, and the submodule B is scanned in the direction Z in order to determine a position where the output of the PDA 4 is maximum. The submodule B is scanned digitally, and the motor MZ is de-energized at a position where the light output is maximum. Then, the submodule B is operated in the directions X, Y by the motors MX, MY (or may be operated in another sequence). The above operation is repeated to determine positions where the light output is maximum (light intensity is maximum) in the respective directions. The adjustment through the angular interval $z_1$ mainly serves to adjust the direction of the PDA 4. Wavelengths are changed, and the above aligning operation is repeated on the photodetectors of the PDA 4 in different channels to determined the optical position in the direction z.

After the above alignment process is completed, the adjustment tube 51 is moved into contact with the submodule A, and then temporarily fixed thereto. To fix the adjustment tube 51 to the submodule A, an ultraviolet-curable resin is dropped, and then an ultraviolet light source is turned on to apply ultraviolet radiation to cure the ultraviolet-curable resin. Since only the ultraviolet-curable resin is unable to provide sufficient bonding strength, after the temporarily fixed module is removed from the automatic aligning mechanism, it is reinforced by a desired adhesive which is curable at normal temperature. Heat-curable adhesives are not preferable as they would degrade and modify the PDA 4, etc.

According to a modification within a scope for achieving the object of the present invention, the separable regions of the optical demultiplexer module are not limited to those in the above embodiments. The same method as described above is applicable to optical systems which need alignment. For example, the same method is applicable to an optical demultiplexer module which employs an optical fiber array or an optical waveguide array instead of the PDA, and also to an optical switch or an optical modulator which employs a reflecting mirror, other than an optical demultiplexer module, or a semiconductor laser or a light source module using a semiconductor laser array.

INDUSTRIAL APPLICABILITY

According to the present invention, since an optical demultiplexer module is constructed of two separate submodules, it can easily be aligned and assembled for increased productivity. Each of the submodules may be assembled with a level of accuracy that can be achieved by abutment of component profiles. Therefore, no skilled practice is required, and the assembling process may be automatized. Optical demultiplexer modules for use in the field of optical communications can thus be mass-produced with high accuracy.

What is claimed is:

1. A method of aligning and assembling an optical demultiplexer module having at least an input fiber, a collimator lens, a diffraction grating, and a photodetector array, comprising the steps of:

(a) preparing a submodule A including said input fiber and said photodetector array which are fixed in respective positions, and a submodule B including said diffraction grating and said collimator lens which are fixed in respective positions;

(b) preparing an alignment jig for allowing said submodules A, B to move independently of each other, and, when the submodules are held by said alignment jig, adjusting the submodules such that a reference surface of said submodule A and an alignment moving direction in which said submodule B is relatively movable for alignment have a predetermined relationship to each other;

(c) fixing said submodule A to said adjustment jig such that a reference line of said photodetector array lies horizontally;

(d) fixing said submodule B to said adjustment jig such that grooves of said diffraction grating extend vertically; and (e) applying light having a wavelength corresponding to one or more channels from said input fiber, and moving said submodule B with respect to said submodule A to align the submodules for maximizing a light output from a photodetector corresponding to said channel or channels.

2. A method according to claim 1, wherein said submodule B further includes first and second tubes slidable against each other, said collimator lens and said diffraction grating being fixed to said second tube, said method further comprising the step of:

(f) bringing said first tube as an adjustment tube into sliding contact with said second tube while said second tube is being fixed, and bonding said submodules A, B to each other, so as to hold a positioning relationship between said submodules A, B after said step (e).

3. A method according to claim 1, wherein said alignment moving direction is a direction Z along which said submodules A, B are movable toward and away from each other, and said predetermined relationship is a relationship in which said reference surface of said submodule A and said alignment moving direction of said submodule B are perpendicular to each other.

4. A method according to claim 1, wherein said alignment moving direction is a direction X along which said submodules A, B are movable horizontally parallel to each other, and said predetermined relationship is a relationship in which said reference surface of said submodule A and said alignment moving direction of said submodule B are parallel to each other.

5. A method according to claim 1, wherein said alignment moving direction is a direction Y along which said submodules A, B are movable vertically parallel to each other, and said predetermined relationship is a relationship in which said reference surface of said submodule A and said alignment moving direction of said submodule B are parallel to each other.

6. A method according to claim 1, wherein said alignment moving direction is a direction z around an optical axis of said submodule B, and said predetermined relationship is a relationship in which said submodule B is angularly displaceable with respect to said reference surface of said submodule A.

7. A method according to claim 1, wherein said alignment moving direction includes a direction Z along which said submodules A, B are movable toward and away from each other, a direction X along which said submodules A, B are movable horizontally parallel to each other, a direction Y along which said submodules A, B are movable vertically parallel to each other, and a direction z around an optical axis of said submodule B, said step (e) comprising the step of successively moving the submodules A, B successively in the directions Z, X, Y, z to maximize light outputs in the respective directions.

8. A mechanism for automatically aligning an optical demultiplexer module having a submodule A including an input fiber and a photodetector array which are fixed in respective positions, and a submodule B including a diffraction grating and a collimator lens which are fixed in respective positions, said mechanism comprising:

a fixed table;

a first movable unit mounted on said fixed table and movable in a first moving direction with respect to said fixed table by a first motor which is installed on the first movable unit;

a second movable unit mounted on said first movable unit and movable in a second moving direction with respect to said first movable unit by a second motor which is installed on the second movable unit;

a first support vertically fixed to said second movable unit;

a third movable unit mounted on said first support and movable in a third direction with respect to said first support by a third motor which is installed on the third movable unit, said third movable unit having gripping means for gripping said submodule B;

a rotary actuator unit mounted on said third movable unit for gripping and rotating said submodule B on said third movable unit with a fourth motor which is installed on said rotary actuator unit;

a second support vertically fixed to said fixed table for supporting said submodule A fixedly thereon;

a light source for introducing light of an arbitrary wavelength into said optical fiber; and a computer system for controlling said first through fourth motors to move said submodule B with respect to said submodule A to maximize an optical output from said photodetector array which detects a light beam applied from said submodule A through said input fiber and reflected and focused by said collimator lens and said diffraction grating of said submodule B.

9. A mechanism according to claim 8, wherein said first moving direction is a direction Z along which said submodule B gripped by said rotary actuator unit is movable toward and away from said submodule A in an axial direction with respect to a reference surface of said submodule A which is fixed to said second support.

10. A mechanism according to claim 8, wherein said second moving direction is a direction X along which said submodule B gripped by said rotary actuator unit is movable horizontally parallel to a reference surface of said submodule A which is fixed to said second support.

11. A mechanism according to claim 8, wherein said third moving direction is a direction Y along which said submodule B gripped by said rotary actuator unit is movable vertically parallel to a reference surface of said submodule A which is fixed to said second support.

12. A mechanism according to claim 8, wherein a direction in which said submodule B gripped by said rotary actuator unit is gripped and rotated on said third movable unit is a direction about an axis of said submodule B.

* * * * *